July 7, 1970　　　D. B. TODD　　　3,519,199
SOLIDS HANDLING CENTRIFUGAL EXTRACTOR
Filed April 3, 1969

INVENTOR:
DAVID B. TODD

United States Patent Office 3,519,199
Patented July 7, 1970

3,519,199
SOLIDS HANDLING CENTRIFUGAL EXTRACTOR
David B. Todd, Saginaw, Mich., assignor to Baker Perkins, Inc., Saginaw, Mich., a corporation of New York
Continuation-in-part of application Ser. No. 630,119, Apr. 11, 1967. This application Apr. 3, 1969, Ser. No. 813,190
Int. Cl. B04b 1/12
U.S. Cl. 233—15                    12 Claims

ABSTRACT OF THE DISCLOSURE

Centrifugal countercurrent extractors having a plurality of concentric perforated contacting elemnts are coated on their radially inner surfaces with a fluorocarbon to fluidize solid material with the heavy phase adjacent the coated surfaces, which also function as surfaces for the coalescence of the heavy phase in the contacting zone. The extractor has particular utility for contacting two substantially immiscible liquid phases of different densities in the presence of dispersed solid material of greater density than the light phase and which therefore tends to flow with the heavy phase. Where the heavy phase clarifying zone contains cylindrical perforated clarifying elements, the inner surfaces of such elements may also be coated with a fluorocarbon, but there will usually be no advantage in coating the outer surfaces of the contacting elements or the heavy phase clarifying elements, nor in coating the outer surfaces of the light phase clarifying elements.

---

This application is a continuation in part of application Ser. No. 630,119, filed Apr. 11, 1967, now abandoned.

BACKGROUND

Liquid-liquid centrifugal countercurrent extractors have been used commercially in the United States at least since the early 1940's. For certain purposes, it has been desired to employ such extractors with liquids containing solid materials. For example, in the late 1940's and early 1950's, such extractors went into widespread use for the extractive recovery of penicillin. Even where filtered fermentation broth was used as the feedstock for the extraction, there was a carry-over of fine solids from the fermentation. There was also a desire to process whole or unfiltered broth. Centrifugal countercurrent exchange devices having a reasonable tolerance for handling solids are described in Podbielniak et al. Pat. 2,758,784 and in Angelo Pat. 2,652,975. Since the inventions covered by these patents, very little progress has been made in the centrifugal extractor art toward improving the capacity of such extractors to process liquids containing solids.

The inlet and outlet streams of centrifugal extractors are arranged so that the countercurrent flow can be regarded as radial, although within the spaces between the contacting elements there is also a turbulent circumferential flow. Since the contacting elements and/or clarifying elements intersect the radial flow, and provide flow arresting or coalescing surfaces, there is a tendency for solid material to accumulate on the surfaces of the elements. The openings or perforations through the elements can become bridged or plugged with solids, thereby enhancing the undesirable accumulation of solids. This condition can be particularly acute in the contacting zone where the elements are ordinarily provided with relatively smaller sized perforations as compared with the elements in the clarifying zones.

The accumulation of solids within the rotors of centrifugal contactors has been a serious problem, which has not been satisfactorily solved until the present invention. The accumulation of solids can reduce the capacity of the rotor, and the non-uniform deposition of solids can unbalance the rotor, causing vibrations, due to a condition of dynamic unbalance. The accumulation of solids can also cause maldistribution of one or both liquids, thereby reducing the efficiency of extraction. When solids accumulation occurs, it is necessary to shut down the operation of the extractor (which is normally operated on a continuous basis), and the cleaning of the rotor may require shutdown periods of as long as several hours, and such cleanings may be required as often as every 12 to 36 hours. The extractor may therefore be out of production of a substantial percent of the time, resulting in a serious production loss. These problems were not adequately solved by the deflector baffle disclosed in Podbielniak et al. Pat. 2,758,784, or the radial clean-out means described in Angelo Pat. 2,652,975.

SUMMARY

This invention is based in part on the discovery that the solids handling capacity of centrifugal liquid-liquid extractors can be greatly enhanced by applying a fluorocarbon coating to the inner surfaces of the cylindrical perforated contacting elements. Polytetrafluoroethylene which is a polymer marketed by E. I. Du Pont De Nemours & Co. under the trademark "Teflon" may be used. While Teflon has been widely used for many years as a coating on metal surfaces to promote the release of foods and other materials from the surfaces, it has not been known to be of any value for application to the contacting elements of centrifugal extractors. It has been standard practice to manufacture the contacting and clarifying elements of such extractors from stainless steel sheets having extremely smooth or polished surfaces. At the same time, the metal surfaces must have a sufficient coefficient of friction to arrest the rotational swirl of the liquids adjacent these surfaces, and for promoting the settling or coalescence of the liquid phases within the spaces between the contacting elements, thereby achieving a repeated sequence of mixing and separation of the liquid phases, and achieving high stage efficiency.

In most liquid-liquid extraction systems where it is desired to carry out the extraction in the presence of solids, the solids are of greater density than the light phase and tend to follow the heavy phase. The solids therefore tend to be thrown outwardly within the rotor by the action of the centrifugal force due to the high speed of rotation. The paramount problem of solids handling is therefore how to maintain the solids fluidized with the heavy phase, especially during the time when the heavy phase is traversing the contacting section of the rotor. In the heavy phase clarifying zone, the solids are dispersed in the continuous heavy phase, and the heavy clarifying zone is a region of high turbulence because of the relatively great centrifugal velocity in the outer portions of the rotor. In the light phase clarifying zone, solids are ordinarily not present to any great extent, except in the rare cases where the solids follow the light phase, or where there is some entrainment or carry-over of the solids into the outer portion of the light phase clarifying zone.

Within the contacting zone, the heavy and light phases are repeatedly dispersed and separated. The action of the contacting elements is such that within each inter-ring space, the heavy phase tends to separate or coalesce on the inner surface of the contacting elements, while the light phase accumulates on the outer surfaces of the contacting elements. This invention for the first time provides a satisfactory means for maintaining the solids fluidized with the heavy phase in the critical regions adjacent the inner surfaces of the contacting elements. This makes it possible on a continuous basis to pass through the rotor as high as 99.9% of all solids with the heavy phase. This greatly reduces the need for shutdown to clean the rotor.

Further, it appears that not only does the Teflon coating on the inner surfaces of the contacting element have no deleterious effect on stage efficiency, but that it actually promotes and maintains maximum stage efficiency.

In operation of extractors constructed in accordance with the present invention, the fluidizing action of the fluorocarbon coated surfaces within the contacting zone is further demonstrated by the greatly reduced and minimal accumulation of solids within the heavy phase clarifying zone, and particularly adjacent the inside surfaces of the outer casing band, which previously had been a particularly troublesome region for solids accumulation.

DRAWING

The present invention is shown in an illustrative embodiment in the accompanying drawing, where:

DESCRIPTION

Figure 1:
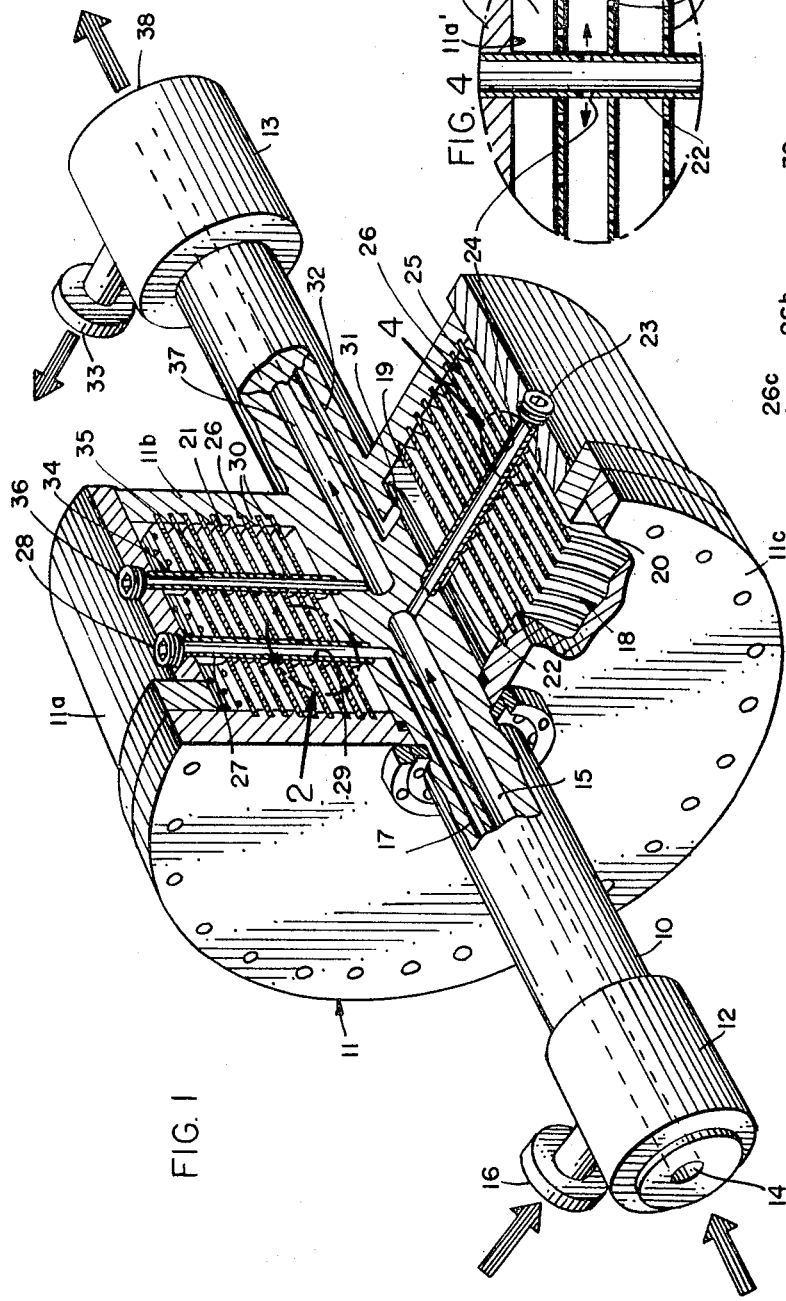
FIG. 1 is a cutaway perspective view of a centrifugal extractor rotor embodying the present invention, some of the components of the rotor being shown diagrammatically.

The improved solids handling extractor of the present invention, as shown in FIG. 1, includes a rotatably supported shaft 10, and a cylindrical rotor 11 mounted coaxially on shaft 10 for rotation therewith. Preferably, shaft 10 and rotor 11 are supported for rotation about a horizontally-extending axis. As is well known in the art, shaft 10 is mounted on a suitable base, and the outer ends of the shaft, for example at 12 and 13, are provided with suitable bearings, and dynamic seals to permit liquids to be introduced into and removed from passages within the shaft. Suitable means is also provided for driving shaft 10 at controlled rotational speeds, such as the speeds within the range from 500 to 3000 r.p.m. As shown in FIG. 1, the light phase is introduced at 14 which communicates through a seal to shaft passage 15, and the heavy phase is introduced at 16 which communicates through a seal with shaft passage 17.

The rotor 11 includes an outer casing band 11a, which is connected to a fixed end plate 11b on one side and a removable end plate 11c on the other side. Within the rotor there is provided a radially-extending working space 18. By virtue of the arrangement and location of the heavy phase and light phase inlets, the interior of the rotor, comprising working space 18, is divided into an inner light phase clarifying zone 19, an outer heavy phase clarifying zone 20, and an intermediate contacting zone 21. As shown in FIG. 1, light phase shift passage 15 communicates with tube 22 which has its upper end closed by plug 23 and includes outlet ports 24, which discharge the incoming light phase inwardly of heavy phase clarifying element 25 and outwardly of the outermost contacting element 26. Similarly, heavy phase shaft passage 17 communicates with tube 27 having its outer end closed by plug 28 and providing outlet ports 29 which introduce the heavy phase between the innermost contacting element 26 and the outer of the two light phase clarifying elements 30.

It will be understood that the heavy phase clarifying element 25 is in the heavy phase clarifying zone 20, while the light phase clarifying elements 30 are in the light phase clarifying zone 19, while the contacting elements 27, six of which are shown in FIG. 1, are within the contacting zone 21. It will be further understood that for the purpose of simplicity the number of contacting elements which would normally be employed have been reduced, and that the radial spacing between the contacting elements would normally be considerably less than that shown in relation to the diameter of the rotor. Further, a greater number of clarifying elements than those shown can be employed in either the light or heavy phase clarifying zones.

The light phase is removed from zone 19 through port 31, which communicates with shaft passage 32, and is discharged at 33. The heavy phase is removed from zone 20 through ports 34, and passes through tube 35, the outer end of which is closed by plug 36 to shaft passage 37 for discharge at 38. It will be understood that plugs 23, 28 and 36, and tubes 22, 27 and 34 may be made removable through casing band 11a.

Figure 3:
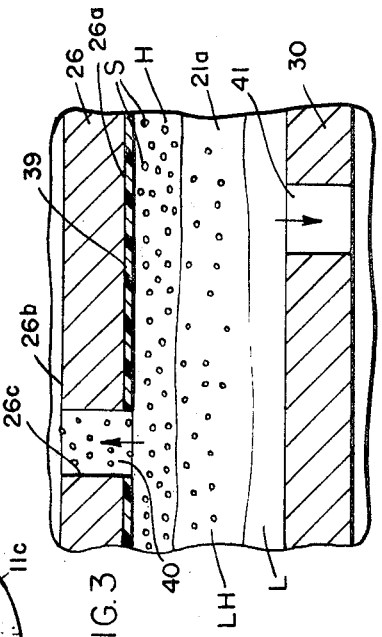
FIG. 3 is a greatly enlarged fragmentary view showing sections of the innermost contacting element and the outermost light phase clarifying element, the section shown being indicated by circle 3 in FIG. 2.
Figure 2:
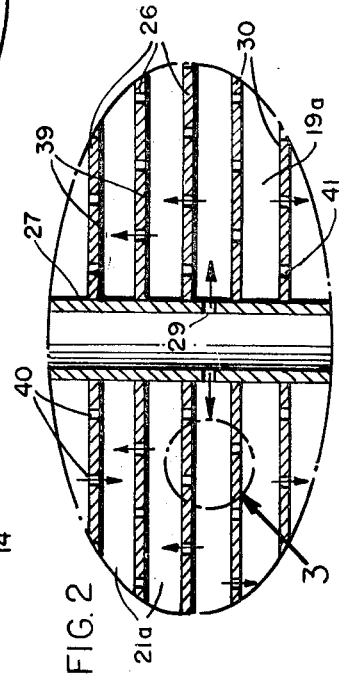
FIG. 2 is an enlarged fragmentary view of the interior of the rotor, the area shown being designated by the circle 2 in FIG. 1.

In accordance with the present invention, the radially inner surfaces of the contacting elements or cylinders 26 may be provided with a fused adherent coating of polytetrafluoroethylene. Preferably, the coating is applied so as to cover the entire inner surfaces of the contacting elements. As shown in FIGS. 2 and 3, the coating is indicated by the number 39. The coating is at most only a few mils in thickness, and no effort need be made to eliminate microporosity. Preferably, the contacting elements 26, as well as the clarifying elements 25 and 30 are formed from stainless steel. For example, the coating may have a thickness within the range from 0.3 to 2.0 mils, and typically has a thickness of from .5 to 1.5 mils. A specific coating usable for the purpose of this invention is Teflon TFE Coating No. 80–201, manufactured and sold by E. I. du Pont de Nemours & Co., Wilmington, Del.

In practicing the present invention, the contacting elements, such as the elements 26 can be made from stainless steel sheet material, the elements being cut, formed, and welded to a predetermined cylindrical shape before being coated. The Teflon coating, prepared as an aqueous dispersion, is sprayed in a thin film over the inside surfaces of the contacting elements. These surfaces should be clean, and if desired, they can be roughened to improve the adherence of the coating. After application of the coating, the contacting elements are heated in an oven to a temperature of about 725–800° F. to bake or fuse the coating. The elements are then ready for use in the extractor.

As shown in FIGS. 2 and 3, the contacting elements 26 are provided with a multiplicity of openings or perforations 40 which extend approximately radially through the elements, and which provide passages for the heavy phase to flow outwardly and the light phase inwardly through the interring spaces 21a. The light phase clarifying elements 30 are similarly provided with a multiplicity of openings or perforations 41 through which the light phase flows toward the shaft 10. As indicated in FIG. 3, the perforations 41 in the clarifying elements 30 are usually of larger diameter than the perforations 40 in the contacting elements 26. It will be understood that the perforations 26 and 30 may be distributed both axially and circumferentially over the contacting and clarifying elements. Preferably, the inner surfaces 26a of the contacting elements 26 which are provided with the coating 39 have a greater area than the total cross-sectional area of the openings or perforations 40.

As shown in FIG. 3, the outer surfaces 26b of the contacting elements may be free of the Teflon coating. Further, the coating 39 preferably terminates around the inner edge portions of the openings 40, and the radial surfaces 26 defining the openings are preferably substantially free of the coating, as indicated in FIG. 3.

Figure 4:
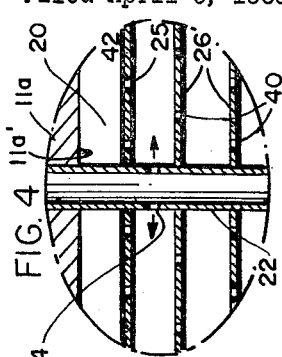
FIG. 4 is an enlarged fragmentary view of the interior of the rotor, the area shown being indicated by circle 4 in FIG. 1.

The light phase clarifying elements, such as the elements 30, need not be coated, as indicated in FIG. 3, and can have both their inner and outer surfaces substantially free of the coating. In FIG. 4, there is shown the inner surface 11a' of the outer casing band 11a. This surface may be formed of metal, such as stainless steel, and may be uncoated, as indicated in FIG. 4. The heavy phase clarifying element 25 is shown in FIG. 4 as coated on both the inner and outer surfaces thereof. This construction for all the heavy clarifying elements is advantageous. However, the coating may be applied to only the innermost heavy phase clarifying element, such as the element 25. It will be appreciated that the inner surface of the innermost clarifying element, such as the inner surface of the element 25 will be adjacent the inlet of the heavy phase, and the solid material will frequency be introduced to the rotor with the heavy phase. Alternatively the coating 39 may be applied to only the inner surfaces of the heavy phase clarifying elements. It will be understood that all the heavy clarifying elements will be provided with liquid transfer openings or perforations, such as the openings 42.

An important operational principle of extractors constructed in accordance with the present invention is illustrated diagrammatically in FIG. 3. Within the interring space 21a the heavy phase tends to collect or coalesce along the inner surface of contacting element 26 in contact with coating 39, as indicated by the letter H. The light phase tends to collect or coalesce along the outer surface of the element 30, which happens to be the outermost light phase clarifying element but the same situation applies to the outer surfaces of the contacting element 26 as the heavy phase moves outwardly and the light phase inwardly through the contacting zone 21. In the intermediate portions of the interring spaces 21a, as indicated in FIG. 3, the light and heavy phases are mixed or dispersed, as indicated by the letters LH. The solids indicated by the letter S tend to follow the heavy phase and to be relatively concentrated within the coalescing region H, but by virtue of the coating 39 the solids remain fluidized so that they flow outwardly through the openings 49 with the coalesced heavy phase. At the same time, the coated surfaces of the contacting elements 26 remain effective for separation of the heavy phase.

An experimental embodiment of a solids handling centrifugal extractor constructed substantially as illustrated in FIG. 1 was tested on the extraction of unsaponifiables from a vegetable oil soap stock by use of a chlorinated solvent. Greatly improved results were obtained as compared with the same apparatus having the inner surfaces of the contacting elements uncoated. For example, with the extractor embodying the present invention, the running time between cleanouts was extended by over 30%, and the shutdown time for cleanout was reduced by at least 33%. Product yield was increased by from 10 to 15%. It was observed that the extractor constructed in accordance with the present invention gave substantially smoother operation with less tendency toward uneven buildup of solids with consequent unbalancing. Although the inside of the rotor casing was not coated with the polytetrafluoroethylene, there was an accumulation of only a minor amount of solids in this area. It is also believed that an improvement in extraction efficiency was obtained. After a number of weeks of operation, there was no evidence of attrition of the polytetrafluoroethylene coating, and the extractor continued to provide the desired advantages of the present invention.

While in the foregoing specification this invention has been described in relation to a specific preferred embodiment thereof, it will be apparent that the invention is susceptible to other embodiments, and that certain of the details described herein can be varied without departing from the essential principles of the invention. For example, other adherent coatings of plastic release agents having properties similar to polytetrafluoroethylene can be used. Also, where the solids tend to follow the light phase, the coating can be applied to the outer surfaces of the contacting elements and to the outer surfaces of the light phase clarifying elements. It will be understood that the outer circumferentially-extending surfaces of the contacting elements function for the coalescence of the light phase within the spaces between the elements, and that the fused adherent coating of polytetrafluoroethylene substantially covering these outer surfaces thereby assists in fluidizing any solid material following the light phase. Extractors constructed in accordance with the present invention can be used for a wide variety of liquid-liquid extractions were the light or heavy phase as introduced to the rotor carriers solids, and where the solids are of great density than the light phase and tend to follow the heavy phase.

In using the term fluorocarbon we contemplate a composition such as derived from a fluorinated olefin or diolefin which has been homopolymerized or addition copolymerized with another unsaturated moiety, such as vinyl, acrylic, etc. Exemplary of polymeric compositions falling within the scope of the above definition in addition to polytetrafluoroethylene are fluorinated ethylene propylene, polychlorotrifluoroethylene, polyvinylidene fluoride, and diolefin type products, such as copolymers of 1,1,2-trifluorobutadiene-1,3 as set out in U.S. Pat. 3,398,128 to Bolstad. It is considered that fused adherent coatings of each of the compositions mentioned could be substituted for the coating of polytetrafluoroethylene described.

I claim:

1. A centrifugal countercurrent extractor for contacting two substantially immiscible liquid phases of different densities, a light phase and a heavy phase, in the presence of dispersed solid material of greater density than said light phase and which tends to flow with said heavy phase, said extractor being further characterized by a cylindrical rotor adapted for rotation about its axis, said rotor providing an enclosed radially-extending working space divided into an inner light phase clarifying zone, an outer heavy phase clarifying zone, and an intermediate contacting zone, at least said contacting zone containing a plurality of axially-extending radially-spaced contacting elements, said elements providing inner circumferentially-extending surfaces for the coalescence of said heavy phase within the spaces between said elements and said elements having openings therethrough for passing the heavy phase outwardly and the light phase inwardly, wherein the improvement comprises a fused adherent coating of polytetrafluoroethylene substantially covering said inner surfaces, whereby said solid material is fluidized with said heavy phase adjacent said surfaces.

2. The centrifugal extractor of claim 1 wherein the outer surfaces of said contacting elements are substantially free of said coating.

3. The centrifugal extractor of claim 1 wherein said coating has a thickness of 0.5 to 1.5 mils.

4. The centrifugal extractor of claim 1 wherein said heavy phase clarifying zone includes at least one perforated cylindrical clarifying element concentric with said contacting elements and providing circumferentially-extending surfaces substantially covered with a fused coating of tetrafluoroethylene polymer.

5. A centrifugal countercurrent extractor for contacting two substantially immiscible liquid phases of different densities, a light phase and a heavy phase, in the presence of dispersed solid material of greater density than said light phase and which tends to flow with said heavy phase, said extractor being further characterized by a cylindrical rotor adapted for rotation about its axis at speeds within the range from 500 to 3000 r.p.m., said rotor providing an enclosed radially-extending working space divided into an inner light phase clarifying zone, an outer heavy phase clarifying zone, and an intermediate contacting zone, at least said contacting zone containing a plurality of axially-extending radially-spaced contacting elements, said elements providing inner circumferentially-extending surfaces for the coalescence of said heavy phase within the spaces between said elements and said elements having openings therethrough for passing the heavy phase outwardly and the light phase inwardly, wherein the improvement comprises a fused adherent coating of polytetrafluoroethylene substantially covering said inner surfaces, said coated surfaces having a greater area than the total cross-sectional area of said openings through said elements, the outer surfaces of said elements being substantially free of said coating.

6. The centrifugal extractor of claim 5 wherein said coating has a thickness of 0.5 to 1.5 mils.

7. The centrifugal extractor of claim 5 wherein said heavy phase clarifying zone includes at least one perforated cylindrical clarifying element concentric with said contacting elements and providing circumferentially-extending surfaces substantially covered with a fused coating of tetrafluoroethylene polymer.

8. The centrifugal extractor of claim 5 wherein said coating on said inner surfaces terminates around the inner edge portions of said openings, the outer circumferential surfaces of said contacting elements and the radial surfaces defining openings being substantially free of said coating.

9. A centrifugal countercurrent extractor for contacting two substantially immiscible liquid phases of different densities, a light phase and a heavy phase, in the presence of dispersed solid material which tends to flow with said light phase, said extractor being further characterized by a cylindrical rotor adapted for rotation about its axis, said rotor providing an enclosed radially-extending working space divided into an inner light phase clarifying zone, an outer heavy phase clarifying zone, and an intermediate contacting zone, at least said contacting zone containing a plurality of axially-extending radially-spaced contacting elements, said elements providing outer circumferentially-extending surfaces for the coalescene of said light phase within the spaces between said elements and said elements having openings therethrough for passing the heavy phase outwardly and the light phase inwardly, wherein the improvement comprises a fused adherent coating of polytetrafluoroethylene substantially covering said outer surfaces, whereby said solid material is fluidized with said light phase adjacent said surfaces.

10. A centrifugal countercurrent extractor for contacting two substantially immiscible liquid phases of different densities, a light phase and a heavy phase, in the presence of dispersed solid material which tends to flow with one of said phases, said extractor being further characterized by a cylindrical rotor adapted for rotation about its axis, said rotor providing an enclosed radially extending working space divided into an inner light phase clarifying zone, an outer heavy phase clarifying zone, and an intermediate contacting zone, at least said contacting zone containing a plurality of axially extending radially spaced contacting elements, said elements providing inner and outer circumferentially extending surfaces and having openings therethrough for passing the heavy phase outwardly and the light phase inwardly, wherein the improvement comprises a fused adherent coating of polytetrafluoroethylene substantially covering certain of said surfaces, whereby said solid material is fluidized adjacent said surfaces.

11. A centrifugal countercurrent extractor for contacting two substantially immiscible liquid phases of different densities, a light phase and a heavy phase, in the presence of dispersed solid material which tends to flow with one of said phases, said extractor being further characterized by a cylindrical rotor adapted for rotation about its axis, said rotor providing an enclosed radially extending working space divided into an inner light phase clarifying zone, an outer heavy phase clarifying zone, and an intermediate contacting zone, at least said contacting zone containing a plurality of axially extending radially spaced contacting elements, said elements providing inner and outer circumferentially extending surfaces and having openings therethrough for passing the heavy phase outwardly and the light phase inwardly, wherein the improvement comprises a fluorocarbon coating substantially covering certain of said surfaces, whereby said solid material is fluidized adjacent said surfaces.

12. A centrifugal countercurrent extractor for contacting two substantially immiscible liquid phases of different densities, a light phase and a heavy phase, in the presence of dispersed solid material of greater density than said light phase and which tends to flow with said heavy phase, said extractor being further characterized by a cylindrical rotor adapted for rotation about its axis, said rotor providing an enclosed radially-extending working space divided into an inner light phase clarifying zone, an outer heavy phase clarifying zone, and an intermediate contacting zone, at least said contacting zone containing a plurality of axially-extending radially-spaced contacting elements, said elements providing inner circumferentially-extending surfaces for the coalescence of said heavy phase within the spaces between said elements and said elements having openings therethrough for passing the heavy phase outwardly and the light phase inwardly, wherein the improvement comprises a fluorocarbon coating substantially covering said inner surfaces, whereby said solid material is fluidized with said heavy phase adjacent said surfaces.

References Cited

UNITED STATES PATENTS

| | | | |
|---|---|---|---|
| 2,652,975 | 9/1953 | Angelo | 233—15 |
| 3,008,434 | 11/1961 | Maldari | 107—14 |
| 3,344,983 | 10/1967 | Podbielniak | 233—15 |

ROBERT W. JENKINS, Primary Examiner